US011812106B1

United States Patent
Roberts et al.

(10) Patent No.: US 11,812,106 B1
(45) Date of Patent: Nov. 7, 2023

(54) AUTOMATIC FEEDBACK FOR PROPER PLACEMENT OF WI-FI CONNECTED SET TOP BOX

(71) Applicant: Calix, Inc., San Jose, CA (US)

(72) Inventors: Harold A. Roberts, Excelsior, MN (US); Francisco Moreno, Santa Clara, CA (US)

(73) Assignee: Calix, Inc., San Jose, CA (US)

( * ) Notice: Subject to any disclaimer, the term of this patent is extended or adjusted under 35 U.S.C. 154(b) by 0 days.

(21) Appl. No.: 17/940,890

(22) Filed: Sep. 8, 2022

(51) Int. Cl.
*H04N 21/442* (2011.01)
*H04N 21/2385* (2011.01)
*H04N 21/61* (2011.01)
*H04N 21/4363* (2011.01)

(52) U.S. Cl.
CPC ... *H04N 21/44227* (2013.01); *H04N 21/2385* (2013.01); *H04N 21/43637* (2013.01); *H04N 21/6143* (2013.01)

(58) Field of Classification Search
CPC ......... H04N 21/44227; H04N 21/2385; H04N 21/43637; H04N 21/6143
See application file for complete search history.

(56) References Cited

U.S. PATENT DOCUMENTS

| | | | |
|---|---|---|---|
| 2014/0269634 A1* | 9/2014 | Shapira | H04W 72/54 370/336 |
| 2018/0199217 A1* | 7/2018 | Varlakov | H04B 17/318 |
| 2021/0160722 A1* | 5/2021 | Rengaraju | H04W 24/10 |
| 2023/0140805 A1* | 5/2023 | Chari | H04W 48/20 370/329 |

* cited by examiner

Primary Examiner — Mulugeta Mengesha
(74) Attorney, Agent, or Firm — Staniford Tomita LLP

(57) ABSTRACT

Embodiments include an automatic set top box placement (STB) process and system that balances video playback needs against the performance characteristics of individual devices and the communications system. For video playback, this involves maintaining required sustained data rates needed to support video of various levels of quality and resolution and matching these against the capacity of the Wi-Fi system in terms of channel capacity and gateway/Access Point to STB connection quality. An intelligent network controller calculates the STB total airtime. Each STB is associated with a Service Set Identifier (SSID) that the controller uses to identify the STB clients. The controller calculates the End-to-End PHY rates for each client. The total STB airtime can then be calculated and compared to the default allocation for the STBs. Recommendations regarding moving STBs, gateways, and or satellite/booster devices can then be provided to the user.

16 Claims, 6 Drawing Sheets

300

| Video Resolution | Recommended Sustained Speed |
|---|---|
| 4K | 20 Mbps |
| HD 1080p | 5 Mbps |
| HD 720p | 2.5 Mbps |
| HD 480p | 1.1 Mbps |
| HD 360p | 0.7 Mbps |

| MIMO Order | Recommended Minimum PHY Rate |
|---|---|
| 1x1 | 100 Mbps |
| 2x2 | 200 Mbps |
| 3x3 | 300 Mbps |

| Operating Parameter | Set/Default Value |
|---|---|
| Video App Sustained Speed | 10 Mbps |
| Max Total Airtime for Simultaneous STBs | 50% |
| STB Recommended EtE PHY rate | 200 Mbps |
| STB Minimum EtE PHY rate | 100 Mbps |

| Device Characteristic | Set/Calculated Value |
|---|---|
| Airtime per STB | Calculated |
| Potential Total STB Airtime | Calculated |
| Red Warning Flag Value | Default Max Total Airtime Allowed |
| Yellow Warning Flag Value for STB Lower than Recommended PHY rate | First Set Value |
| Red Warning Flag Value for STB Lower than Minimum PHY rate | Second Set Value |

AUTOMATIC FEEDBACK FOR PROPER PLACEMENT OF WI-FI CONNECTED SET TOP BOX

TECHNICAL FIELD

Embodiments are directed to wireless networks and devices, and specifically to automatically determining optimum placement of Wi-Fi connected set top boxes.

BACKGROUND

A set top box (STB) or "cable box" is a device that enables a television to receive and decode digital television (DTV) broadcasts. Wireless STBs receive the broadcast signal via Wi-Fi and provide a composite of HD (high-definition) signal as output to the TV.

The increasing proliferation of home Wi-Fi devices has presented a challenge in maintaining Wi-Fi bandwidth in many households. Determining whether Wi-Fi connected STBs in a home have sufficient Wi-Fi capacity to support simultaneous streaming video on all devices is difficult for the consumer or an installer to determine.

With current Wi-Fi network installations, a subscriber or network installer must work by trial and error or use certain 'rules of thumb' to install single or multiple Wi-Fi connected STBs to see if the installation allows adequate capacity to support simultaneous video streaming services. Such a process is time-consuming, tedious, and lacks any guarantee of satisfactory results.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Calix, GigaSpire, GigaSpire BLAST, and SmartTown are trademarks of Calix, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 3 is a table that illustrates recommended sustained transmission speeds for various different video resolutions, under an example embodiment.

FIG. 4 is a table 400 that illustrates recommended minimum PHY rates for different MIMO configurations, under an example embodiment.

FIG. 6 is a table that illustrates some example operating parameters, under some embodiments.

FIG. 7 is a table that illustrates some example device characteristics, under some embodiments.

DETAILED DESCRIPTION

Figure 1:
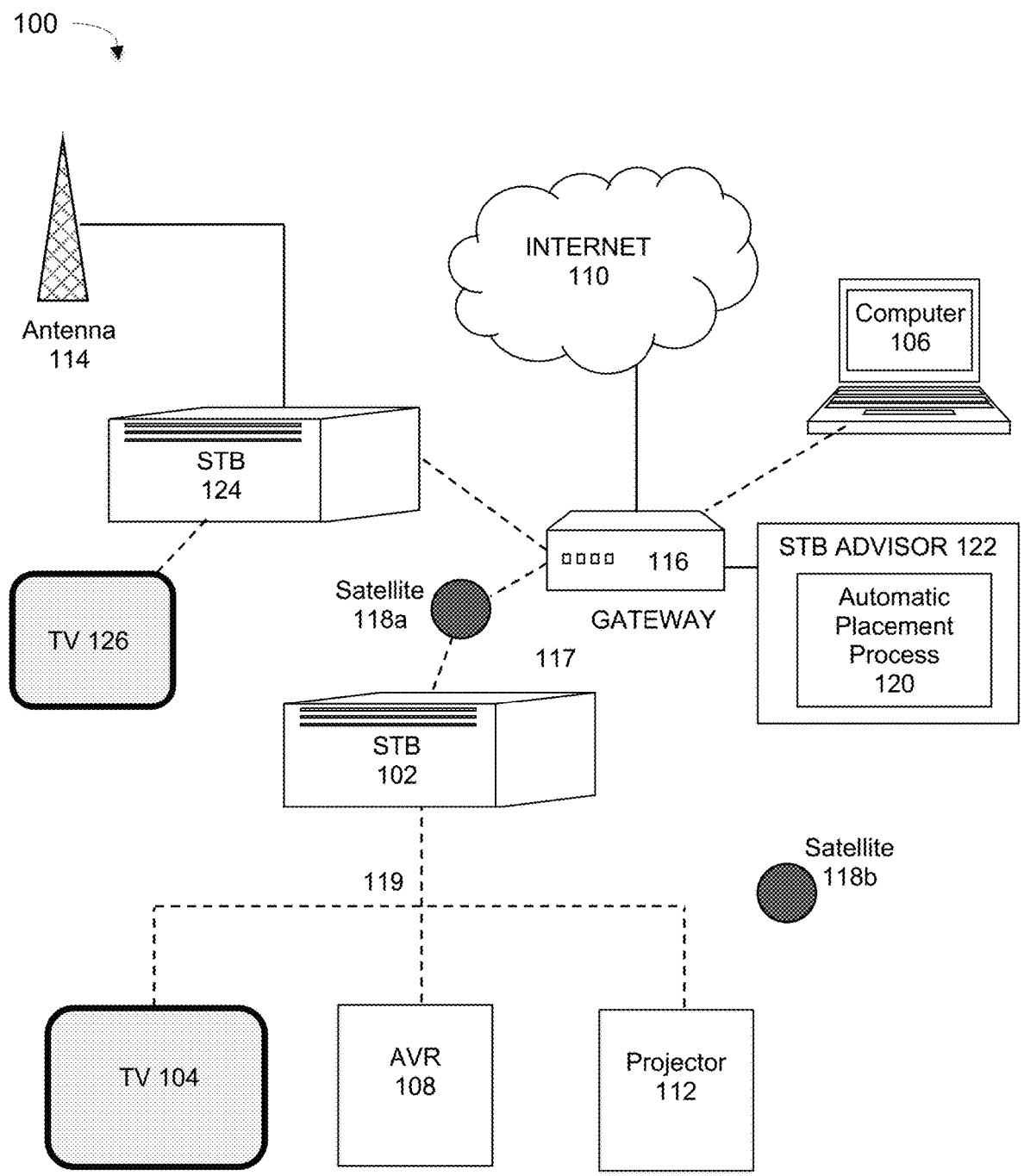
FIG. 1 illustrates a wired and wireless network implementing a process of automatically determining optimum placement of Wi-Fi connected set top boxes, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

FIG. 1 illustrates a network that implements an automatic feedback process for proper placement of Wi-Fi connected set top boxes (STBs), under some embodiments. As shown in FIG. 1, network 100 comprises one or more STBs 102 and 124 located within a home or similar environment. The STB connects an antenna 112 or satellite dish transmitting broadcast signals to one or more receivers, such as television sets 104. The dish/antenna receives over-the-air signals consisting of different broadcast channels from broadcast channel providers and a built-in tuning circuit box selects one channel among these received channels depending on user control. The STBs may be configured and connected in various different ways. For example, an STB may be connected to the gateway 116, whereas another STB 102 may be connected to a satellite 118a which is connected to the gateway 116 through Wi-Fi or hardlink (e.g., Ethernet) cable.

Most STBs are streaming devices, such as a streaming-only STB (e.g., Technicolor, Amino, Roku or AppleTV) streaming box. For the case of a Roku box (or similar box), the STB the case of Roku could be an integrated Roku STB and TV display (i.e., a Roku TV) that are managed by the subscriber themselves. Others (e.g., Amino) may be managed by the service provider. Any other type and configuration of STB is also possible. For example, STB 124 is a box that has a connection to the antenna/dish 114 and wired or wireless connections to display devices 126.

The gateway or router 116 that accesses the Internet 110 for interfacing various other devices such as computer 106, and other Internet-enabled devices.

The STB 102 or 124 may include one or more internal components to support different output devices. For example, it can include a digital satellite receiver, digital cable receiver, digital terrestrial receiver and digital IP TV. This allows the STB to be connected to many different types of home devices and equipment, however, such an STB usually feeds a display device. For the example shown STB 102 can feed a regular TV or Internet Protocol TV (IPTV) 104, an audio/video receiver (AVR) 108, projector 112, such as in a Home Theater environment. The AVR 108 may switch the audio and video signal to the desired audio and video system. An AVR may have several STBs that it switches to a single audio and video display.

Network 100 includes different types of links, such as wired links or wireless links. Each device or network element may represent a node in the network and is coupled to at least one or more other nodes for transmission of messages (data packets) in accordance with defined routing protocols. For example, network clients may be laptop/notebook computers (e.g., 106), tablet computers, cell phones, IoT (internet of things) devices, and other wireless devices while the router 116 forwards traffic to and from the gateways (e.g., STB 102), which may be connected to the Internet 110.

For the example shown in FIG. 1, the link 117 between the STB 102 and gateway 116 may be a wireless link (e.g., 802.11), and likewise, the links 119 between the various display/receiver devices may be either wired or wireless links. The wireless protocols may be implemented using IEEE 802.11, Bluetooth, or any other appropriate wireless standard. Some of the transmission links used in network 110 may be cellular communication links or any other telephonic or WAN/LAN network link, and internal or external wired links may be implemented using copper, fiber, or any other appropriate hardwired link. In the case of wireless connections, one or more satellite devices 118a, 118b, etc. may be placed around the home or area to boost the Wi-Fi signal. Such a satellite may also be referred to as a 'Wi-Fi booster,' 'range extender,' 'repeater' or similar term, and are often used when distances between devices are great and/or signal strength is low due to equipment of physical constraints.

It should be noted that FIG. 1 illustrates an example network and many different network configurations and topographies are possible. Devices (or nodes) can be added to the network, or organized into sub-networks as provided by certain known networking protocols. FIG. 1 illustrates one example of a network topology, and embodiments are not so limited. A network of any practical scale, architecture, and configuration can be used with embodiments of the processes and components described herein.

System 100 of FIG. 1 represents a managed Wi-Fi network in which the gateway 116 and satellites 118a, 118b represent a single or multiple access points. These devices may be consumer installed STBs or devices specifically offered by the network operator. FIG. 1 illustrates STBs (102, 124) in various configurations, such as with and without a connection to an antenna 114, an STB that connects directly to the gateway 116, and an STB that connects to the gateway 116 via a satellite 118a, but it should be noted that other configurations are also possible.

In a typical home environment, many different IP and broadcast TVs may be available for use in various rooms and by various users at any one time. Each device consumes a certain amount of bandwidth with some devices and types of content consuming more bandwidth than others. Such bandwidth limitations can impact the quality of content delivery as overtaxed networks and devices may cause network latencies and impose buffering or delays in signal playback.

In the case of wireless set top boxes, placement is also an important concern as playback quality is dependent on signal strength. Home environments often pose challenges with respect to signal obstructions (walls, furniture, etc.), limited placement possibilities, low-power devices, poor signal conditioning, and so on. Optimum placement of the gateway 116, set top boxes 102 or 124 and optional satellites 118a,b is therefore an important consideration in achieving and maintaining adequate playback quality in a home environment.

An STB generally represents a device that has a minimum or recommended data rate that the device needs for the applications it supports. Once this data rate is known, embodiments of process 120 can calculate the expected airtime and determine whether the airtime will be exceeded for the STB or a combination of STBs in simultaneous use.

Figure 2A:
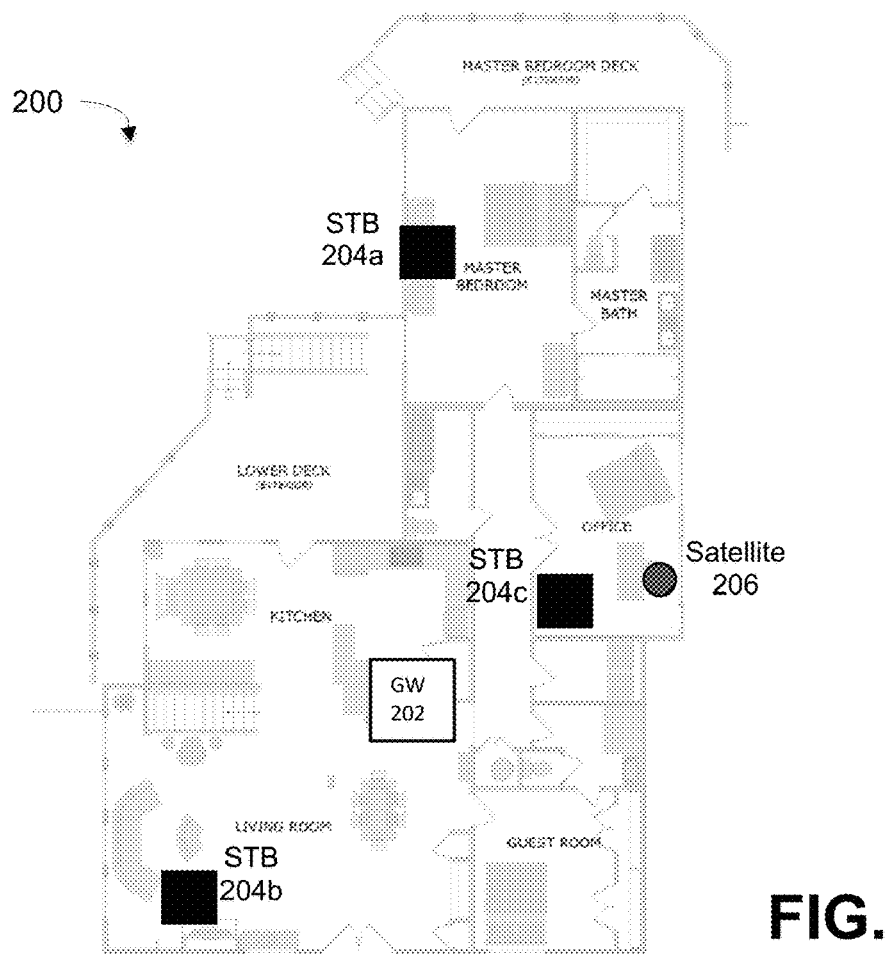
FIG. 2A is a plan view of one floor of an example house that contains certain networked Wi-Fi devices, under an embodiment.
Figure 2B:
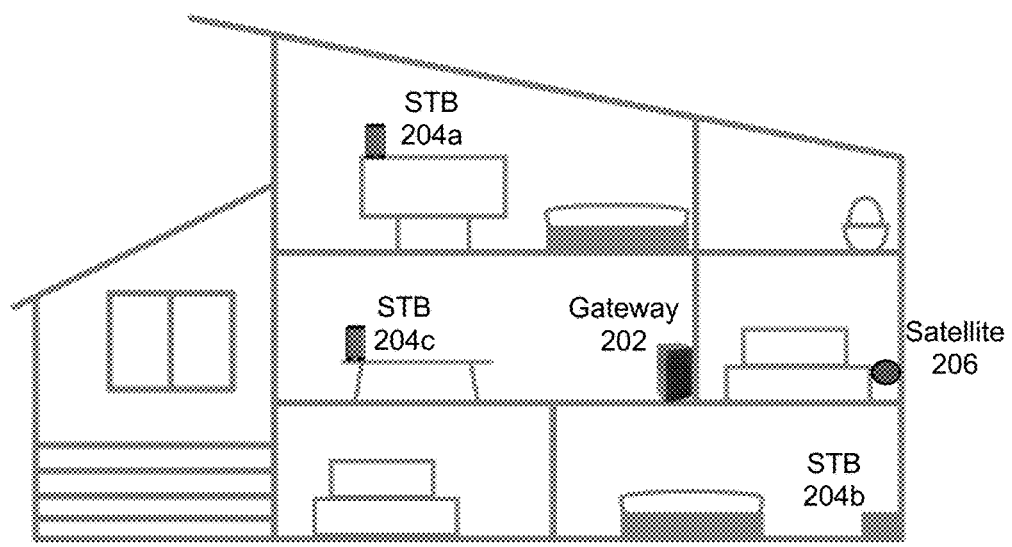
FIG. 2B is a side view of the example house of FIG. 2A.

FIG. 2A is a plan view of one floor of an example house that contains certain networked Wi-Fi devices, under an embodiment, and FIG. 2B is a side view of the example house. As shown in FIG. 2A, a house 200 has a number of different rooms, as appropriately labeled, and one gateway 202 device located somewhere in the house. This device transmits signals to one or more STBs 204a-c, and one or more satellites 206 may also be present to boost the signal within the house. A house may be of a substantial size, with many rooms, as well as two or more floors, as shown in FIG. 2B. The STBs and other devices may be positioned in any appropriate areas, such as next to or near televisions, computers, and other such devices.

Although embodiments may be described with respect to a home or enclosed environment (e.g., facility, auditorium, conference center, store, etc.), it should be noted that embodiments are not so limited. Embodiments may also be used in a community Wi-Fi environment, such as a Calix SmartTown™ Wi-Fi managed environment. Such a system comprises a special set of clients that the network operator provides service with specific bandwidth needs, such that the system software can predict the amount of channel airtime that will be needed, such as based on client Wi-Fi capabilities and location. The SmartTown Wi-Fi provides community-wide coverage by combining wide-scale residential and small business Wi-Fi systems with strategically deployed hotspot Wi-Fi access points in public gathering areas, event centers, and private locations. The community Wi-Fi service can be provided on a temporary basis for special events, such as concerts, fairs, sporting events, rallies, and so on, in which Wi-Fi demand may be very heavy for a relatively short duration. Alternatively, it may be provided on a permanent or semi-permanent basis for an open location, such as a public square, meeting area, and so on.

In an embodiment, the SmartTown (or similar) community Wi-Fi system is a service that a provider can offer which utilizes certain Wi-Fi alliance standards (e.g., Wi-Fi Alliance Passpoint 2.0) to provide Wi-Fi access to subscribers using certain Wi-Fi access point devices. One such example device is a Calix Gigaspire BLAST. These devices extend the access network into the home and act as a strategic location for control of the network by supporting broadband connectivity of data and video services and offering the latest 802.1 lax 'Wi-Fi 6' technology, and extending voice capabilities. The Calix GigaSpire provides switching and routing functions that support multi-Gigabit throughput for IPTV video and data services. An example device, the GigaSpire BLAST u6.2, uses a 2.5 Gigabit Ethernet link at the subscriber's premises to provide carrier-class Wi-Fi. The GigaSpire BLAST u6.1 uses a one Gigabit Ethernet link at the subscriber's premises to provide carrier-class Wi-Fi. Other models can support an SFP+ module that allows for one Gigabit to ten Gigabit connections using Ethernet, Active Ethernet and GPON. Any number of interfaces (e.g., four) Gigabit Ethernet LAN interfaces can be provided for customer multi-media devices Such operating parameters are provided for purposes of example only, and other similar access point devices can also be used.

The community Wi-Fi network built on these type devices can provide a complete end-to-end solution with service provisioning managed via a support cloud network (e.g., Calix Support Cloud). This means the provider does not need to setup additional infrastructure such as radius servers, GRE tunnels, captive portals, etc. The service can be enabled on existing Calix Gigaspire systems deployed in subscriber homes creating the community Wi-Fi network as well as deployed on new outdoor Gigaspire systems placed strategically around the community to further extend coverage. The provider can create specific communities for grouping subscribers as well as creating temporary communities for one-time events such as concerts, festivals, conferences, etc. When a subscriber is enrolled in a community, they can then download and install a profile specification on their mobile device (e.g., phone, tablet, laptop), which will allow connection to the SmartTown Wi-Fi network. After installing the profile one time, anytime the subscriber is within range of an access point that is part of the SmartTown Wi-Fi community, the device will automatically connect to the network.

Although a specific community Wi-Fi system is mentioned for purposes of example, any similar open or large-scale Wi-Fi environment may also implement embodiments described herein.

Though the placement of STBs may be constrained by certain factors, such as relatively fixed or preferred locations of TV sets and so on, at least some degree of freedom of movement is usually possible with respect to gateways, satellites and STBs in most cases. As stated in above, present methods of optimizing STB placement is usually done by trial and error with respect to minimizing any degradation in signal playback, and manually trying different positions of devices until any problems are fixed. This is can be an imprecise and painstaking effort however, which does not always end up with optimum component placements. As shown in FIG. 1, embodiments include an automatic placement process 120 that automatically determines whether a specific topology of STBs and Access Points (APs), such as the gateway and satellites, is capable of supporting the desired video services and further provides recommendations on how to reconfigure a network to support the desired services and then re-evaluates the network when the recommendations are implemented.

In an embodiment, the process 120 is provided as part of a component or platform referred to as a 'STB Advisor' 122 that provides automatic guidance on STB location and installation. Such a component could be part of a separate network controller, or it could be included as part of the gateway 116, as shown.

Process 120 uses continuously monitored physical layer attributes to determine fractional airtime consumption by the STBs to aid in system setup and continued deployment in several different use cases. In a first example use case, a technician installing set-top boxes in the Wi-Fi network wants visibility in the gateway's Graphical User Interface (GUI) of some information relevant to how adequate is a device's current location is while considering simultaneous use of all STBs. In a second example use case, a subscriber (user) with set-top boxes in a Wi-Fi network wants visibility of some information relevant to how adequate is their current location so they can confirm and maintain optimal location and performance of video streaming and other Wi-Fi usage. Other similar setup, deployment, and continued use situations involving locating devices within the home may also be considered.

In an embodiment, the automatic placement process 120 uses a fundamental premise that the fraction of the total channel airtime needed for the overall system can be calculated for each STB and then summed up together for a total airtime needed from the channel if all STBs are operating simultaneously. This is based on the End-to-End (EtE) Physical Layer (PHY) rates to each STB in a home, and also based on an assumed required 'X' Mbps bandwidth for each STB while video content is playing. In general, a Wi-Fi network cannot achieve perfect 100% airtime usage without degradation in latency and packet errors. Therefore, it is assumed that a percentage of airtime is 'unusable.' A fraction of the total usable channel airtime for all network services other than STBs must then be allocated. If the sum of all the airtimes needed for STBs and these other services, and the airtime margin is greater than 100%, it can be deduced that the STBs in their current configuration will potentially overload the Wi-Fi channel.

This overload situation can be resolved by either reducing the total number of STBs or improving the End-to-End PHY rates of the STBs (with attention directed to the STBs with the lowest rates) until the total airtime needed for all STBs is within the limit allocated. The EtE rates of the STBs can be improved by several different means, such as (1) moving the gateway to a more central location, (2) moving the STBs closer to the gateway, or (3) using additional satellites to provide better EtE rates to the furthest STBs.

In an embodiment, an intelligent network controller calculates the STB total airtime. Each STB is associated with a special STB Service Set Identifier (SSID). This means that the controller can identify the STB clients based on their SSID. The controller can calculate the End-to-End PHY rates for each client (as described below) and then the total STB airtime can be calculated and compared to the default allocation for the STBs.

The overall system involves balancing the video playback needs against the performance characteristics of the individual devices and communications system as a whole.

With respect to the video playback needs, this involves maintaining required sustained data rates needed to support video of various levels of quality and resolution and matching these against the capacity of the Wi-Fi system in terms of channel capacity and gateway/AP to STB connection quality. For video streaming requirements, an example is taken of a common application using high bandwidth today, which is 4K Ultra HD streaming. One service provider states that their 4K streaming service requires a minimum of 15 Mbp but 25 Mbps is recommended, while another needs at least 10 Mbps, but for 4K at 60 frames per second with HDR enabled 35 Mbps is required, and latency must be below 100 milliseconds and possibly below 20 milliseconds. FIG. 3 is a table 300 that illustrates recommended sustained transmission speeds for various different video resolutions, under an example embodiment. Surveying the requirements from various video streaming services, as exemplified in Table 300, has shown that the increase required for 4K over 1080p is a factor of approximately three to four times. Extrapolating this further, it can be appreciated that 8K Ultra HD might require 45 Mbps to 80 Mbps. Such speed requirements can likewise be deduced for other future video resolutions.

A home network may support many devices that may require data flow simultaneously, and background traffic representing other Wi-Fi traffic in the home from non-video sources may also impact system performance.

The total theoretical capacity of Wi-Fi is based on the available spectrum for use by Wi-Fi. This spectrum has been growing over the years since the introduction of the early versions of the IEEE 802.11 protocol. While both 2.4 GHz and 5 GHz UNII bands were defined early, for certain practical reasons 2.4 GHz was used almost exclusively in consumer equipment. Wi-Fi was correctly considered incapable of reliably carrying high definition video when 2.4 GHz was the only available option. Only when low cost 5 GHz components became available was Wi-Fi considered a feasible medium for reliable video delivery, since the capacity of the 5 GHz band is 2.6 to 8 times more than the 2.4 GHz band and interference is substantially lower. Additionally, 5 GHz makes the use of wider 40 MHz and 80 MHz channels practical.

For a given radio circuit (e.g., either AP or STB radios), the maximum data carrying capacity is based on the channel it is using, the MIMO capability of the radio and the version of the 802.11 standard used by the radio. The capacity of an AP/STB connection is limited by the capacity of the more limited radio, generally the STB. In typical usage and depending on the signal strength and quality supported Physical Layer (PHY), the data rate from the AP to the STB can vary from 61 Mbps to 1201 Mbps. The channel capacity is therefore not an immutable number, but instead constantly changes depending on which STB is connecting to the AP at what time.

How much of the channel capacity is being used at any given time depends on the channel airtime utilization. The airtime of the channel may be used by traffic within the subscriber's Wi-Fi network or may be used by other Wi-Fi networks or non-Wi-Fi radio frequency power. Any channel airtime used by something other than the subscriber's network will be considered to be interference. Any channel airtime that is unused will be considered Free Airtime. A well designed Wi-Fi network should always have a significant amount of Free Airtime, and a low amount of Free Airtime is an indication that changes may be needed in the network. Given that the system can never use airtime greater than 100%, it is certain that any set of simultaneous services that, when combined approach or exceed 100% airtime utilization, will lead either to visible video impairments or downshifting of the desired video resolution.

The PHY rate is a representation of a single link layer connection. In mesh Wi-Fi networks, an STB may not be connected directly to a gateway AP but rather to a satellite AP, which is in turn wirelessly connected to the gateway AP. In the case where the Wi-Fi data from the gateway is repeated to the STB by a satellite, there are two PHY rates to consider. The 'backhaul PHY rate' from gateway to satellite and the 'fronthaul PHY rate' from satellite to STB. The effective PHY rate from the gateway to the STB can be calculated and is called the End-to-End PHY rate. In the case of a single hop from gateway to STB, the EtE PHY rate is the same as the fronthaul PHY rate from the gateway. Embodiments of process 120 use the EtE PHY as part of any calculations described herein.

Certain minimum PHY rates are needed based on the STB rate capabilities. FIG. 4 is a table 400 that illustrates recommended minimum PHY rates for different MIMO configurations, under an example embodiment. Popular 4K streaming devices (e.g., Apple TV 4K and Roku 4K) are 2×2 MIMO devices, which have a recommended minimum PHY rate of 200 Mbps. Other device configurations may be 1×1 MIMO (not recommended) which has a rate of 100 Mbps, and 3×3 MIMO (which may be used for 8K streaming boxes) with a rate of 300 Mbps. Table 300 is provided for purposes of illustration only, and other configurations and recommended minimum PHY rates may also be possible.

Figure 5:
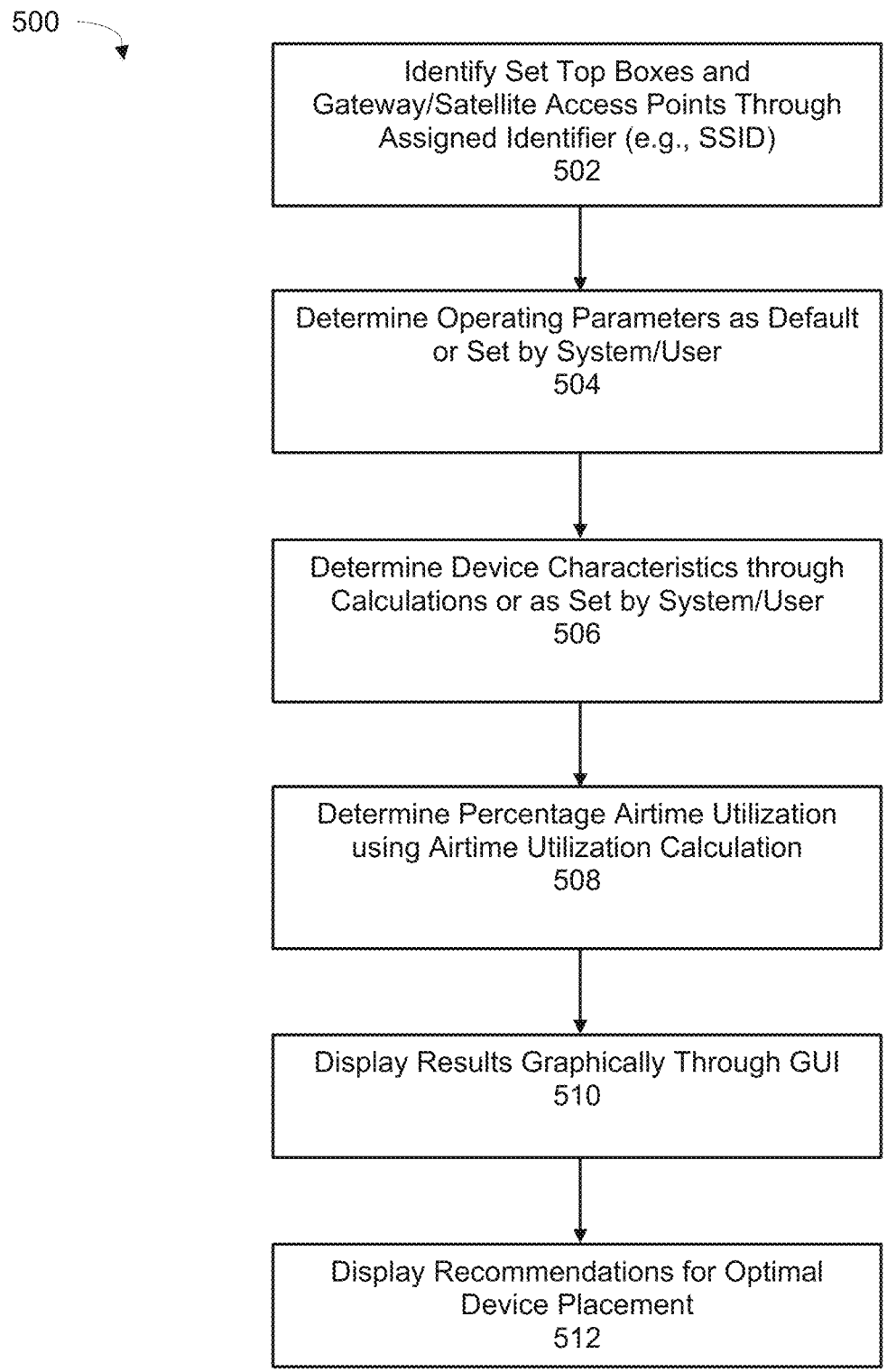
FIG. 5 is a flowchart that illustrates a method of performing automatic Wi-Fi device placement using airtime utilization calculations, under some embodiments.

Once the general or theoretical video streaming requirements are determined, the characteristics of the STB and AP devices are determined and then certain calculations are performed to determine the airtime utilization. FIG. 5 is a flowchart that illustrates a method of performing automatic Wi-Fi device placement using airtime utilization calculations, under some embodiments. Process 500 of FIG. 5 starts by identifying all relevant STB and APs (gateways, satellites) through an assigned identifier, 502. In an embodiment, all such devices in the network that are specifically designated "STB SSID" will be considered set top boxes. The SSID identifier may be used to uniquely identify a device as well as indicate a device type, such as STB, gateway, satellite, and so on. In addition, the SSID can be assigned and used to identify different types of clients, such as computers, phones, IP TVs, IoT devices (thermostats, etc.), and so on.

In step 504, the process determines certain operating parameters some of which may be set by the system or user, or may be default settings. FIG. 6 is a table 600 that illustrates some example operating parameters, under some embodiments. As shown in FIG. 6, the example operating parameters and associated default or set values comprise the video application sustained speed (real Ethernet rate, not PHY rate): default=10 Mbps; the maximum total airtime allowed for all STBs in simultaneous operation: default=50/a; STB recommended End-to-End PHY rate: default=200 Mbps; and STB minimum End-to-End PHY rate: default=100 Mbps. Table 600 is provided for purposes of illustration only, and other operating parameters and default values are also possible.

It should be noted that with respect to certain rates, such as the sustained video speed, the Ethernet rate requirements must be converted into PHY rate requirements, since PHY rates are easily measured across Wi-Fi networks. Under ideal conditions an Ethernet rate of 80% of PHY rate may be obtained. However, it can be expected that Ethernet rates of 50% of PHY rates may be expected in real world conditions. Therefore, a general rule requires that Ethernet rates be doubled to convert to corresponding PHY rates. Another embodiment involves directly using the video application Ethernet data rate used by the STB rather than 'guessing' the recommended sustained speed.

In step 506, the process determines certain device characteristics, some of which may be set by the system or user, or determined through certain calculations (described in greater detail below). FIG. 7 is a table 700 that illustrates some example device characteristics, under some embodiments. As shown in FIG. 7, the example device characteristics and associated values comprise the airtime per STB as calculated using a specific formula (described below) or measured directly if the Wi-Fi SoC supports this; the potential total STB airtime: sum of airtimes from all STBs; a red warning flag for IPTV SSID if the "Potential Total STB Airtime" exceeds the default maximum total airtime allowed; a yellow warning flag for STB lower than STB recommended PHY rate; and a red warning flag for STB lower than STB Minimum PHY rate. Table 700 is provided for purposes of illustration only, and other device characteristics and value derivations are also possible. Tables 600 and 700 include certain default assumptions that must be made in order to make calculations and determine airtime thresholds, and these defaults may be customizable by the operator.

Once all STBs are in place the End-to-End PHY rate can be calculated per STB and then based on the needed video application recommended bandwidth (speed), the airtime allocation for each STB may be calculated. Thus, as shown in FIG. 5, step 508 involves determining the percentage airtime utilization. In an embodiment, the following equation 1 can be used to calculate the percent airtime utilization (ATU):

$$ATU=((x*2)/X+((y*2)/Y+((z*2)/Z+ \ldots)$$ [Equation 1]

In the above equation 1, the following variables are assigned:
ATU=Total Airtime Utilization of a Channel
x=Video Application Recommended Sustained Speed (Mbps)
X=STBx EtE PHY Rate (Mbps)
To calculate the STBs EtE PHY Rate (X), the following equation 2 can be used:

$$\text{EtE PHY Rate STB}x=1/(1/x+1/a+1/b \ldots)$$ [Equation 2]

In the above equation 2, the following variables are assigned:
x=Backhaul PHY rate of STB x
a=Backhaul PHY rate of SAT a (first satellite between STB and gateway, if it exists)
b=Backhaul PHY rate of SAT b (second satellite between STB and gateway, if it exists)

The above Equation 2 is continued until all satellites between STB and gateway are included.

If there are no satellites the calculation degenerates to the fronthaul PHY rate of the STB, as shown in Equation 3.

$$\text{EtE PHY Rate STB}x=1/(1/x)=x$$ [Equation 3]

An example of the use of the above equations to calculate an EtE PHY rate for STBx is shown as follows:

Gateway→(800 Mbps)→SATa→(600 Mbps) →SATb→(200 Mbps)→STB

So, x=200 Mbps, a=800 Mbps, b=600 Mbps, and the calculation is as follows:

$$\text{EtE PHY Rate STB}x=1/(1/200+1/800+1/600)=126 \text{ Mbps.}$$

With reference back to process 500 of FIG. 5, once the End-to-End PHY rate per STB (e.g., STBx) has been calculated, a network or system topology can be generated and displayed to the user through a GUI, 510.

Figure 8:
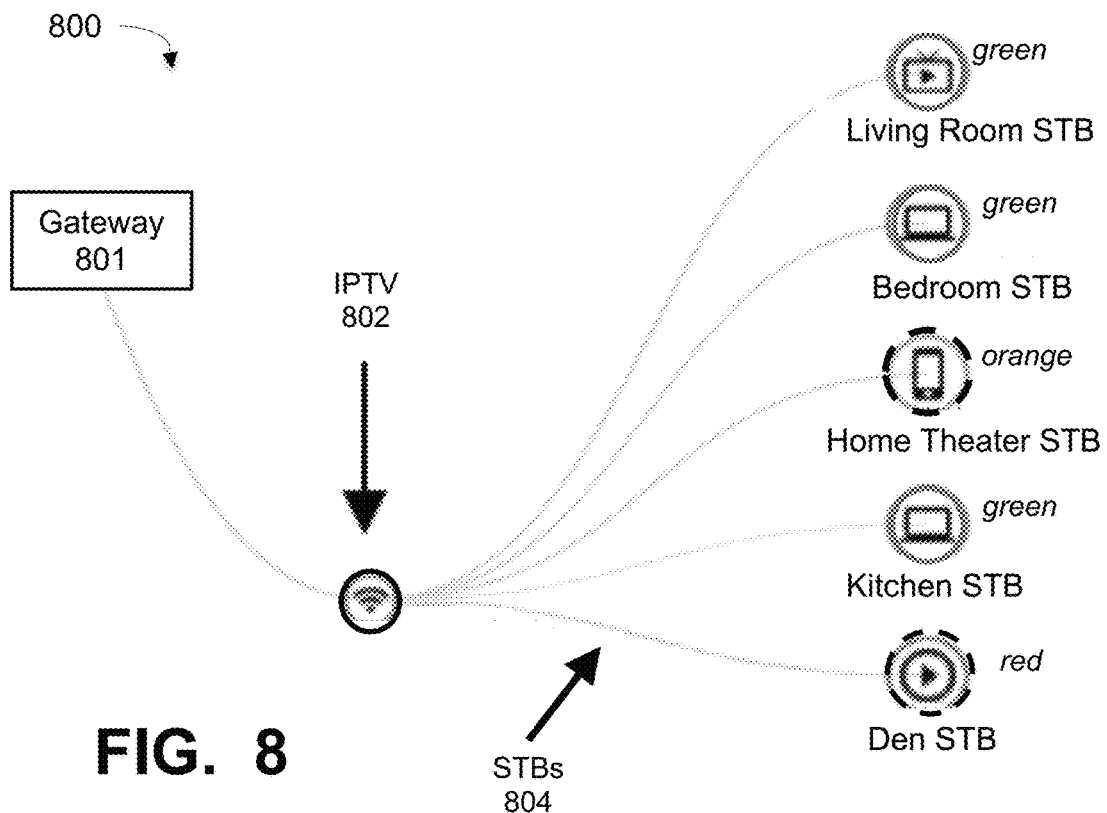
FIG. 8 is an example GUI display for an example STB network topology, under some embodiments.

FIG. 8 is an example GUI display for an example network topology, under some embodiments. The network 800 may be shown with gateway 801 and STB (IPTV) SSID icon 802 shown with the subtending STBs 804. Each STB may represent a device (computer, phone, etc.) or set top box. Optional satellites (not shown) may also be included. Each icon can be labeled appropriately, such as by location, as shown, or some other description, such as device and owner's name. Other labels can also be used, as desired.

The pattern (e.g., highlighting or color) of the STB icon can indicate whether too much airtime will be needed for simultaneous operation. For example, icons can be displayed in certain colors along a spectrum (e.g., green, yellow, orange, red), dashed lines, shaded patterns, or other graded indicators. Displaying the icons along a color or pattern-coded scale, such as by going from green to yellow then red, the allocated airtime can be graphically displayed as being approached or exceeded, and so on, relative to a safe state (e.g., green).

Figure 9:
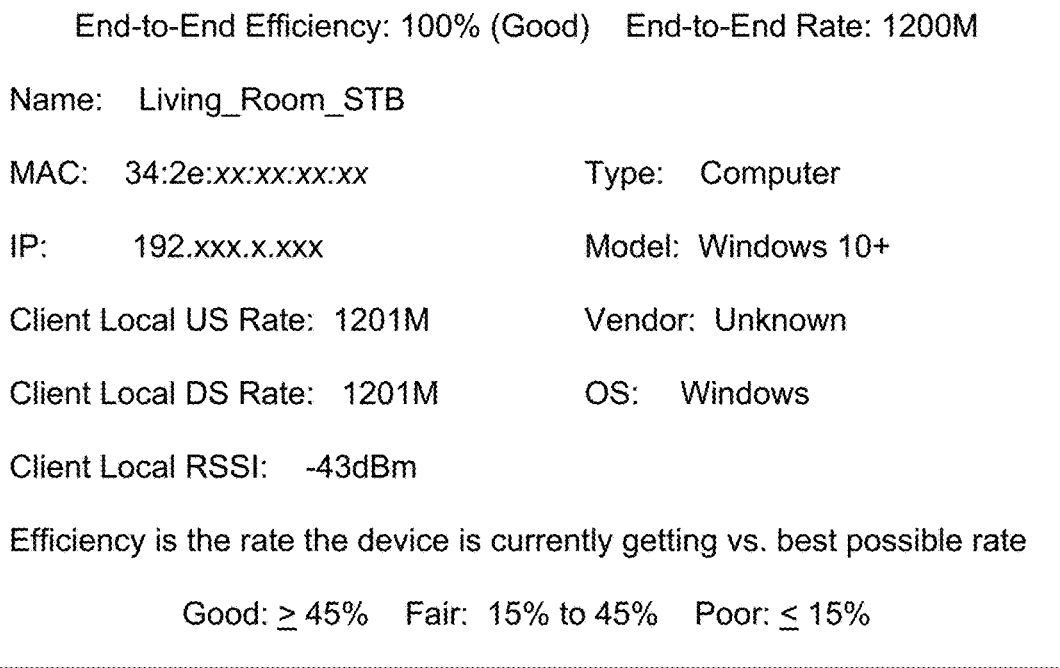
FIG. 9 illustrates a detailed device characteristics display window associated with a mapped device, under an example embodiment.

The End-to-End PHY rate as calculated by the controller can be displayed along with the corresponding icon, or can be activated using certain GUI techniques, such as by hovering over the STB icons 804. FIG. 9 illustrates a detailed device characteristics display window associated with a mapped device, under some embodiments. Display window 900 may be displayed when an icon is selected (such as by hovering), and shows certain example information associated with the device, such as EtE efficiency, and EtE rate, as well as other information, as shown. The GUI format and content of FIG. 9 is shown for purposes of example only, and many other display formats and displayed information are also possible.

Given the graphical display 800, the user can easily identify and focus on the STBs with the lowest EtE PHY rates to further investigate and the reason for the poor EtE PHY rate, or simply move the device to a better location or upgrade or supply with a nearby satellite if the signal strength is too low. The system can thus be configured to automatically display recommendations or suggestions to the user indicating possible device movements, reconfiguring bad devices, installing satellites, and so on, 512.

Embodiments of the automatic device placement process provide automatic and real-time feedback to an installer of STBs to ensure proper and optimal operation. Any Wi-Fi gateway product could use this process, and it could be applied to other devices besides STBs that need an allocation of throughput.

As described above, in an embodiment, system 100 includes an automatic placement process that may be implemented as a computer implemented software process, or as a hardware component, or both in a computing device such as gateway 116 in FIG. 1. As such, it may be an executable module executed by the one or more computers in the network, or it may be embodied as a hardware component or circuit provided in the system. The network environment of FIG. 1 may comprise any number of components coupled over the Internet or similar large-scale network or portion thereof. Each node in the network(s) comprises a computing device capable of executing software code to perform the processing steps described herein.

Such a device may include a processor, memory, interfaces, high-speed expansion ports, and interconnected busses. The processor can process instructions for execution within the computing device, including instructions stored in the memory or on a storage device to display graphical information for a (graphical user interface) GUI on an external input/output (I/O) device, such as a display coupled to high speed interface. In other implementations, multiple processors and/or multiple busses may be used, as appropriate, along with multiple memories and types of memory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In an embodiment, an ASIC design can be used to implement system algorithms as well as hardware accelerated designs for specific use cases.

These computer programs (also known as programs, software, software applications or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The present disclosure, in various embodiments, includes components, methods, processes, systems and/or apparatus substantially as depicted and described herein, including various embodiments, subcombinations, and subsets thereof. Those of ordinary skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of optimally locating Wi-Fi set top box (STB) devices in network in an environment having a gateway access point, the STB devices, and one or more signal boosting satellites, comprising:
   identifying one or more STB devices in the environment, the STB devices wirelessly communicating to a gateway device coupled to an Internet Protocol (IP) network, wherein an STB device comprises a communication device having a minimum data rate to support an application;
   determining operating parameters of each of the STB devices;
   determining device characteristics of the each of the one or more STB devices; and
   determining a percentage airtime utilization of each STB device of the one or more STB devices to calculate a total airtime needed for playback of a video channel, wherein the airtime dictates how much of a channel capacity is used at any given time;
   providing, if the total airtime needed exceeds a maximum available bandwidth, one or more recommendations to reduce the total airtime needed, wherein the recommendations comprise at least one of moving the gateway to a more central location in the environment, moving an STB device closer to the gateway, and installing or moving one or more of the satellites proximate to the STB device.

2. The method of claim 1 wherein the video channel comprises High Definition (HD) television signals played back through one or more televisions coupled to respective STB devices.

3. The method of claim 1 wherein the percentage airtime utilization is a function of a recommended sustained speed of a video application creating the video content, and a physical layer (PHY) rate of a corresponding STB.

4. The method of claim 3 wherein the PHY rate is a function of the backhaul PHY rate of each STB, and a backhaul PHY rate of each satellite coupled between a corresponding STB and the gateway, wherein a backhaul PHY rate comprises a Physical layer rate from the gateway to a satellite and a fronthaul PHY rate comprises a Physical layer rate from a satellite to an STB.

5. The method of claim 4 wherein, if there no satellites are present, the PHY rate comprises a fronthaul PHY rate of the corresponding STB.

6. The method of claim 2 wherein each STB device has an service set identifier (SSID) that uniquely identifies a corresponding device.

7. The method of claim 6 wherein the SSID further specifies a device type of the corresponding device.

8. The method of claim 7 wherein the playback device comprises an Internet Protocol TV (IPTV), and the video content comprises 4K High-Definition video, and wherein the environment comprises one of an enclosed building or a community Wi-Fi environment.

9. A method of optimally locating Wi-Fi set top boxes (STBs) in a home network having different playback devices including a gateway access point and satellites operated by various users at any one time, wherein each device consumes a certain amount of bandwidth and imposing bandwidth limitations that impact the quality of video content delivery, comprising:
- associating each STB with a Service Set Identifier (SSID) that is used by an intelligent network controller to identify STBs in the network;
- calculating, for each STB, a total airtime and an End-to-End (EtE) Physical Layer (PHY) rate;
- calculating a total STB airtime for all STBs in the network based on airtime utilization that dictates how much channel capacity is being used at any given time;
- comparing the total STB airtime to a default allocation of airtime for each respective STB; and
- providing recommendations to a user for STBs for which the total STB airtime exceeds the respective default allocation, wherein the recommendations comprise at least one of moving the gateway to a more central location in the home, moving one or more STBs closer to the gateway, and installing or moving one or more of the satellites proximate to an STB device.

10. The method of claim 9 wherein the satellites boost a WI-FI signal to proximate devices and are distributed throughout the home.

11. The method of claim 9 wherein the total STB airtime is a function of a recommended sustained speed of a video application creating the video content, and a PHY rate of a corresponding STB.

12. The method of claim 11 wherein the PHY rate is a function of the backhaul PHY rate of each STB, and a backhaul PHY rate of each satellite coupled between a corresponding STB and the gateway, wherein a backhaul PHY rate comprises a Physical layer rate from the gateway to a satellite and a fronthaul PHY rate comprises a Physical layer rate from a satellite to an STB.

13. The method of claim 10 wherein the playback devices comprise an IP TV, and the video content comprises 4K High-Definition video.

14. A system comprising:
- one or more Wi-Fi set top boxes (STBs) in a home network;
- a plurality of different playback devices operated by various users at any one time, wherein each device consumes a certain amount of bandwidth and imposing bandwidth limitations that impact the quality of video content delivery;
- a network controller identifying each STB of the one or more STBs through a unique Service Set Identifier (SSID) associated with an STB;
- a calculator calculating, for each STB, a total airtime and an End-to-End (EtE) Physical Layer (PHY) rate, and a total STB airtime for all STBs in the network based on airtime utilization that dictates how much channel capacity is being used at any given time;
- a comparator comparing the total STB airtime to a default allocation of airtime for each respective STB; and
- a graphical user interface displaying recommendations to a user for STBs for which the total STB airtime exceeds the respective default allocation, and wherein the recommendations comprise at least one of moving the gateway to a more central location in the home, moving an STB device closer to the gateway, and installing or moving one or more of the satellites proximate the STB device.

15. The system of claim 14 wherein the total STB airtime is a function of a recommended sustained speed of a video application creating the video content, and a PHY rate of the STB.

16. The system of claim 15 wherein the PHY rate is a function of the backhaul PHY rate of the STB, and a backhaul PHY rate of each satellite coupled between the STB and the gateway, wherein a backhaul PHY rate comprises a Physical layer rate from the gateway to a satellite and a fronthaul PHY rate comprises a Physical layer rate from a satellite to the STB, and further wherein, if there no satellites are present, the PHY rate comprises a fronthaul PHY rate of the STB.

* * * * *